Patented Sept. 16, 1952

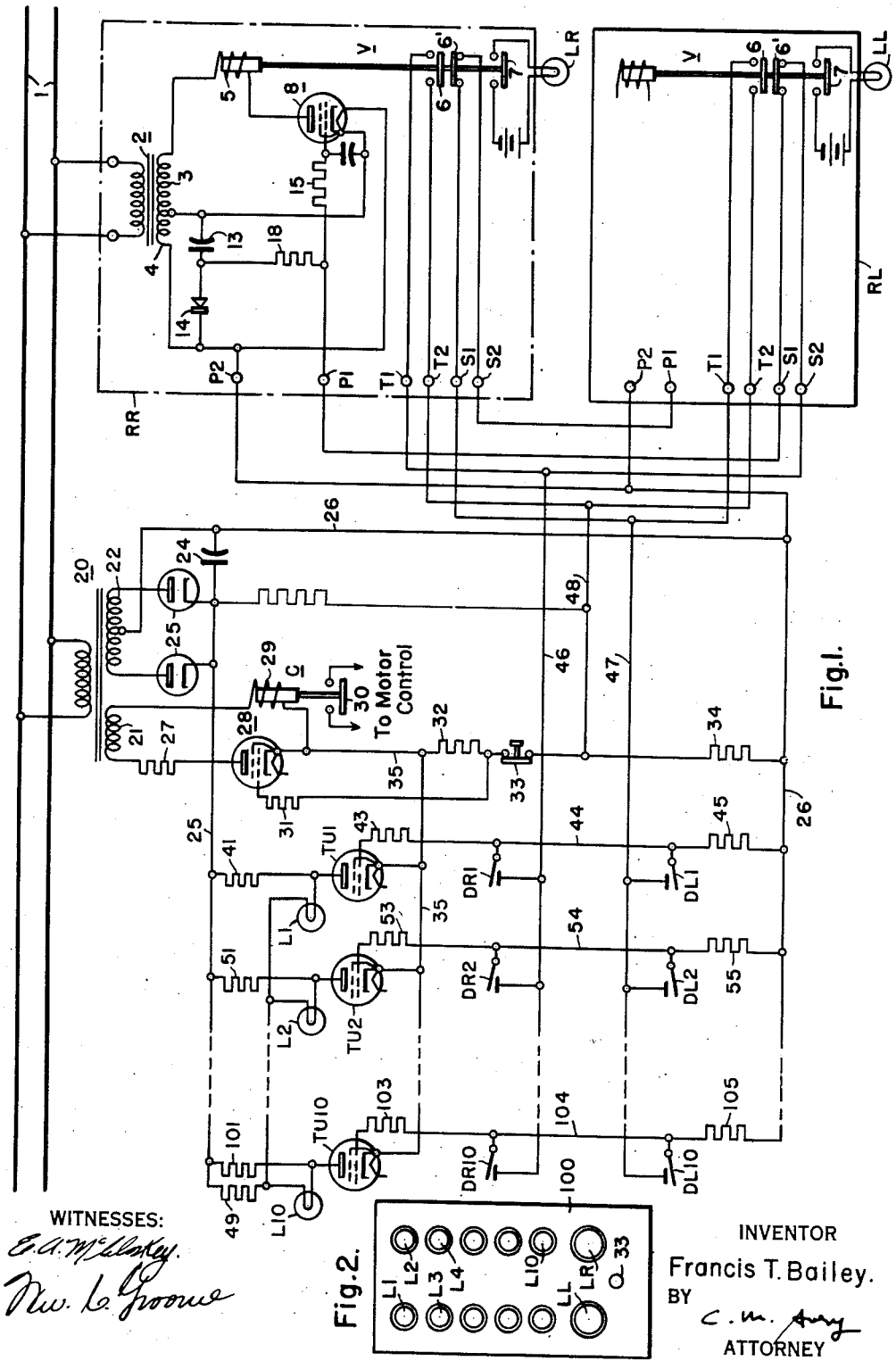

2,611,017

UNITED STATES PATENT OFFICE 2,611,017

FAULT RESPONSIVE INDICATING CONTROL APPARATUS PREFERABLY FOR TEXTILE MACHINERY

Francis T. Bailey, East Aurora, N. Y., assignor to Westinghouse Electric Corporation, East Pittsburgh, Pa., a corporation of Pennsylvania Application June 20, 1950, Serial No. 169,217

10 Claims. (Cl. 177—311)

1

My invention relates to fault-responsive indicating control apparatus preferably for the stop motion control of textile machinery.

Weaving looms, knitting machines and other textile machines are usually equipped with drop wire contacts or other fault-responsive devices which control the drive motor of the machine so as to stop the machine operation in the event of a faulty operating condition or a break of any of the threads being fabricated. It is usually necessary to provide for an automatic indication of the fault location to facilitate finding and eliminating the defect. The necessary electric control and indicating devices in the known equipment of this type involve a large number of components and correspondingly large space requirements when a large number of drop wire contacts or the like fault-responsive devices are needed.

It is an object of my invention to provide for responsive indicating control apparatus of the above-mentioned kind that performs a reliable stop motion or other control together with a definite indication of the fault position while requiring a greatly reduced number of components, thus reducing the space requirements as well as the cost of the apparatus in comparison with those previously available.

According to my invention, I equip the control apparatus with a plurality of electronic control tubes. The main circuit of each control tube has an individual resistance portion connected with an individual indicator and has also a resistance portion in common with the other control tubes. A single master tube for controlling the drive motor of the machine or for performing any other desired control action has its grid circuit connected with the common main circuit portion of all control tubes and hence is set in operation whenever any one of the control tubes becomes active to operate the appertaining indicator. I further arrange the drop wire contacts or other fault-responsive devices in a plurality of groups and provide a corresponding plurality of relay units for controlling respective group indicators. One drop wire contact or control device of each group is connected with one of the respective relay units and also with the grid circuit of one of the above-mentioned respective control tubes. In such an apparatus, the operation of any one of the fault-responsive devices causes the operation of a selected group indicator, together with one of the individual indicators and together with the master control tube.

2

The foregoing and other features of the invention are set forth with particularity in the annexed claims and will be understood from the illustrated example described in the foregoing.

The drawing shows by way of example, a stop motion control for a textile machine which serves to stop the electric drive of the machine in the event of thread break and to indicate the location of the faulty thread. By way of example, the illustrated embodiment is designed for two groups of threads supplied from the thread supply beam, these groups being designated as Right and Left, and is equipped with twenty sets of drop wire contacts, ten for each group of threads, for indicating thread breakage. Each set of contacts may comprise many parallel-connected contacts although only one is shown and hereinafter referred to for each set. A schematic circuit diagram of the control system is shown in Fig. 1, while Fig. 2 represents schematically a view of the indicating panel as it appears to the operator.

As shown in Fig. 1, the control system is equipped with two low-voltage relay units RR and RL. The units are of identical design, and only the unit RR is illustrated with all essential details.

The relay units are energized from an alternating-current line 1 through a transformer 2 with two secondary windings 3 and 4. The secondary windings are series connected and have a common intermediate terminal. Winding 3 provides relatively high voltage, for instance of 195 volts, while winding 4 provides low voltage, for instance of 6.3 volts. The numerical values just mentioned as well as those given hereinafter in parentheses are presented only as examples and may be modified in accordance with the requirements of each particular application.

Connected to the winding 3 is the coil 5 of an electromagnetic relay V with a normally open main contact 6, a normally closed lock-out contact 6', and a normally open signal contact 7. Contact 6, when closed, interconnects the contact or output terminals T1 and T2 of the relay unit while contact 7, when closed, lights an indicator lamp which is denoted by LR for relay set RR and by LL for relay set RL. The connection of relay coil 5 with the transformer secondary 3 includes a normally non-conductive discharge tube 8 whose cathode is heated by filament current from the transformer secondary 4. Connected across secondary 4 is a capacitor 13 (8 mfd.) and a half-wave rectifier or valve 14 preferably of the barrier-layer type. Valve 14 is poled so that the positive terminal of capacitor 13 is in connection with the intermediate terminal of the transformer secondaries and with the cathode of tube 8. Capacitor 13 is normally charged and serves as a source of unidirectional bias voltage for the grid circuit of tube 8. The control grid for tube 8 is connected through a resistor 15 (150,000 ohms) and a resistor 18 (680,000 ohms) to a circuit point between capacitor 13 and valve 14. A control or input terminal P1 of the relay unit is connected with a circuit point between resistors 15 and 18. Another control or input terminal P2 is connected with the cathode of tube 8. The terminals of the relay contacts 6 and 6' are denoted by T1, T2 and S1, S2.

As will be explained, the tube 8 becomes conductive and energizes coil 5 so that relay V picks up when the control terminals P1 and P2 are interconnected by a current path of relatively low resistance under control by the closing of a drop wire contact. Even though the connection between terminals P1 and P2 may be established only for an extremely short period of time, the charge of capacitor 13 remains effective a sufficiently long period to maintain the tube 8 firing for safely closing the relay V. Hence the relay V, once energized, will always close long enough to control a main contactor still to be described.

The illustrated and above-described design of the low voltage relay units is in accordance with one of the available settings of the relays disclosed in applications, Serial No. 794,518, filed December 13, 1947, now abandoned, of F. D. Snyder, and Serial No. 146,366, filed February 25, 1950, of J. M. Cochran. As apparent from the latter application the internal connections of such a relay unit can readily include a timing circuit and can be modified in accordance with a desired time delay. It should also be understood that the particular design of the relay units is not essential to the invention proper and that other relay designs for operating an electromagnetic contactor in response to a low-voltage impulse may be used, for instance a unit as disclosed in application Serial No. 673,390, filed May 31, 1946, now abandoned, of T. H. Draper.

The relay units RR and RL are connected with a drop-wire controlled electronic circuit which includes the twenty drop wires of the machine and is designed as follows.

The electronic network is energized from the line 1 through a transformer 20 with two secondaries 21 and 22. The secondary 22 is mid-tapped and energizes a set of rectifier tubes 23 whose output voltage is filtered by a capacitor 24 and applied to direct-current buses 25 and 26 of substantially constant voltage. Secondary 21 is connected through a resistor 27 (470 ohms) and a master tube 28 (for instance type WL 2050) with the coil 29 of a main contactor C whose contact 30 controls the drive motor of the knitting machine. During the operation of the machine, with line 1 and transformers 2 and 20 energized, the master tube 28 is normally conductive so that contactor C is picked up and closes at 30 the energizing circuit of the motor. As will be explained, tube 28 becomes non-conductive and causes the contactor C to drop out for stopping the motor when any one of the twenty drop wire contacts of the machine closes due to thread break. Three of the ten drop wire contacts or sets appertaining to the Right set of beams are shown at DR1, DR2, and DR10, and three of the ten drop wires appertaining to the Left set of beams are shown at DL1, DL2, and DL10. The circuit connection of the other drop wire contacts (not illustrated) are similar to those shown.

The control grid of the master tube 28 is connected through a grid resistor 31 (100,000 ohms) and through a resistor 32 (2,200 ohms) to the cathode of the same tube. A normally closed reset contact 33 and a series resistor 34 (1000 ohms) connect the resistor 32 with the negative bus 26. This bus is also connected with the terminal P2 of each relay unit RR and RL. Connected between the cathode lead 35 of tube 28 and the positive bus 25 is a control tube TU1 (for instance type WL-2050) in series with an anode load resistor 41. The control grid of tube TU1 is connected through a resistor 43 (100,000 ohms), a lead 44 and a resistor 45 (47,000 ohms) with the negative bus 26 and hence with terminals P2 of respective relay units RR and RL. The drop wire contact DR1 of the Right beam set is disposed between lead 44 and a control bus 46 which is attached to terminals P1 and T1 of relay unit RR. Similarly, the drop wire contact DL1 of the Left beam set is disposed between lead 44 and a control bus 47 connected to the terminals P1 and T1 of relay unit RL. The terminals T2 of both relay units are connected by a common lead 48 to a point between reset contact 33 and resistor 34. An indicator lamp L1 is connected in series with a resistor 49 (4,700 ohms) across the load resistor 41 of tube TU1 so that lamp L1 is lighted by the voltage drop across resistor 41 when tube TU1 is conductive. As long as the drop wire contacts DR1 and DL1 are open, however, the tube TU1 is non-conductive.

The circuits for the other pairs of drop wire contacts (or sets of contacts) are similar to the just described circuits for contacts DR1 and DL1. Thus the circuits for drop wire contacts DR2 and DL2 include a tube TU2 with circuit elements 51, 53, 54 and 55 that correspond to respective circuit elements 41, 43, 44 and 45. Similarly, the illustrated drop wire contacts DR10 and DL10 are connected with the circuits of a tube TU10 for controlling an indicator lamp L10, and the tube circuits include elements 101, 103, 104 and 105 also corresponding to respective elements 41, 43, 44 and 45.

During normal operation of the machine, all lamps are deenergized and the only electronic tube then firing is the master tube 28 whose current causes the motor controlling contactor C to remain closed. Assume that a thread number 10 breaks on the Right beam so that drop wire contact DR10 closes. As a result, terminal P1 of relay unit RR is connected through contact 6' of unit RL, control bus 46, drop wire contact DR10, lead 104, resistor 105 and negative bus 26 with terminal P2 of the relay unit RR.

It will be recognized that the ten control tubes for all ten pairs of drop wire contacts are connected with the positive bus 25 through individual lead resistors to control individual signal lamps, while all ten control tubes have a common cathode lead 35 connected to the negative bus 26 through a resistance circuit 32, 34 part of which is included in the grid circuit of the master tube 28 so that the grid voltage of the latter is changed in the blocking sense when any one of the ten control tubes TU1 ... TU10 passes current through the cathode resistance circuit. This causes tube 8 to fire so that relay V in unit RR picks up and closes its contacts 6 and 7. Lamp LR is lighted and indicates the location of the fault as being on the Right beam. Contact 6 of unit RR ties the control bus 46 to lead 48 and changes the grid bias in tube TU10 so that this tube fires and causes the indicator lamp L10 to glow. This lamp then indicates the particular thread location on the beam. At the same time, the master tube 28 receives a blocking bias and stops firing so that contactor C drops out and stops the machine. Due to the fact that contact 6 of unit RR has shorted the buses 46 and 48 and current is flowing through the relatively low-ohmic resistor 34, the grid of tube 8 in relay unit RR is positive with respect to the cathode so that this tube remains energized and maintains the system in the just-mentioned condition until the reset contact 33 is actuated by the operator to clear the circuit. When relay V in unit RR picks up to effect the just-described operations, contact 6' of the same relay opens and disconnects bus 47 from terminal P1 of unit RL so that the unit RL cannot operate when, due to the subsequent stopping of the machine, all threads should go slack and many or all drop wire contacts should close. In this manner, only the drop wire first to close determines the indicating performance so that a definite indication is assured.

As apparent from Fig. 2, the indicator lamps L1 through L10, LL and LR are preferably mounted on a panel 100 together with the reset push button contact 33. In the event of stoppage due to thread break, the machine operator, by looking at the panel, can immediately determine which drop wire contact has operated, and after eliminating the fault, can start the machine and reset the indication by merely depressing the button.

While the above-described example of the invention involves two groups of fault-responsive control devices in conjunction with two relay units, it is obvious that if desired three or more groups of control devices, together with a corresponding number of relay units, may be provided in a similar manner. In that event, each grid circuit of the control tubes is connected with as many drop wire contacts or other fault-responsive control devices as are groups of devices and relay units present. It will further be understood that the number of control tubes or the number of fault-responsive devices in each group can be chosen in accordance with the requirements of each particular application and that the different groups need not necessarily have equal numbers of fault-responsive devices as long as the number of relay units corresponds to the number of devices in the largest group. Those skilled in the art will further recognize, upon a study of this disclosure, that the circuits of apparatus according to the invention can be modified in various respects without departing from the essential features of the invention, as set forth in the claims annexed hereto.

I claim as my invention:

1. A fault-responsive indicating control apparatus, comprising a plurality of electronic control tubes having respective main circuits and respective grid circuits, said main circuits having individual resistive portions and having a resistive common portion, said individual circuit portions being connected in parallel relation to one another and in series relation to said common portion, a plurality of indicator means connected with said respective individual circuit portions to be controlled by said respective control tubes, an electron master tube having a load circuit to be controlled and having a grid circuit connected with said common circuit portion for controlling said load circuit in dependence upon operation of any one of said control tubes, a number of relay units each having a group indicator to be controlled and each having a relay control circuit, a number of groups of fault-responsive control devices, one of said devices of each group being connected with one of said respective control tube grid circuits and with one of said respective relay control circuits so that each device controls a selected one of said control tubes together with a selected one of said relay units.

2. A fault-responsive indicating control apparatus, comprising a plurality of electronic control tubes having respective main circuits and respective grid circuits, said main circuits having individual resistive portions and having a resistive common portion, said individual circuit portions being connected in parallel relation to one another and in series relation to said common portion, a plurality of indicator means connected with said respective individual circuit portions to be controlled by said respective control tubes, an electronic master tube having a load circuit to be controlled and having a grid circuit connected with said common circuit portion for controlling said load circuit in dependence upon operation of any one of said control tubes, a number of relay units each having a group indicator to be controlled and each having two relay control leads of which one is common to all relay units and connected with all said individual circuit portions, a number of groups of fault-responsive control devices, one of said devices of each group being connected between one of said respective other leads and one of said respective control tube grid circuits, so that each device controls a selected one of said control tubes together with a selected one of said relay units.

3. A fault-responsive indicating control apparatus, comprising two direct-current supply buses, a plurality of electronic control tubes having respective main circuits and respective grid circuits, said main circuits being connected across said buses and having individual resistive circuit portions and a common resistive circuit portion, a plurality of indicator means connected with said respective individual circuit portions to be controlled by said respective control tubes, an electronic master tube having a load circuit to be controlled and having a grid circuit connected with said common resistive circuit portion for controlling said load circuit in dependence upon operation of any one of said control tubes, a number of relay units each having a group indicator to be controlled and each having two relay control leads of which one is connected with one of said buses, a number of groups of fault-responsive control devices, one of said devices of each group respectively being connected between the other of the respective relay control leads and one of said respective control tube grid circuits so that each device controls a selected one of said control tubes together with a selected one of said relay units.

4. A fault-responsive indicating control apparatus, comprising a plurality of voltage relay units each having two control terminals and relay means connected with said terminals and group indicator means controlled by said relay means, a plurality of control buses each connected with one of said terminals of said respective relay units, direct-current supply means having a positive bus and a negative bus, the other terminal of each of said relay unit being connected to said negative bus, a plurality of normally non-conductive control tubes having respective anode load resistors connected to said positive bus and having a common cathode resistance circuit connected to said negative bus, a plurality of signal means connected with said respective anode resistors to be energized when said respective control tubes are conductive, said tubes having respective resistive grid circuits connected to said negative bus, a plurality of groups of fault-responsive switches comprising a different group for each of said relay units, said switches being normally open, one contact of each group being connected between each of said control buses and each of said grid circuits, a contactor to be controlled having a coil circuit, a normally conductive discharge tube series connected in said coil circuit and having a grid circuit extending through a part of said common cathode resistance circuit, and said relay means of said unit, having respective normally open control contacts connected between said common cathode resistance circuit and said respective control buses, whereby closing of any one of said switches causes one of said relay units to actuate the one appertaining group indicator and to energize one of said control tubes for actuating the appertaining signal means and de-energizing said coil circuit.

5. Fault responsive control apparatus comprising, a main normally conducting discharge tube having a load circuit to be controlled and having a grid circuit, a plurality of normally non-conducting control tubes each having respective anode circuits and a common cathode circuit including an impedance device, the grid circuit of said main discharge tube including said impedance device in a polarity sense such that discharge current of said control tubes through said impedance device is effective to stop conduction of said main discharge tube, each control tube having a grid circuit, a normally non-conducting relay control tube having an anode-cathode circuit and a control grid; a relay having a control coil connected in the anode-cathode circuit of said relay control tube, grid biasing means for the relay control tube comprising a normally charged capacitor connected between the grid and cathode of the relay control tube to apply a cut-off bias thereto, respective normally open fault responsive switching devices connected to the respective grid circuits of the respective control tubes and connected between the grid and cathode of the relay control tube for establishing a discharge path for said capacitor when closed, said capacitor when discharging applying a bias to the grid of the relay control tube to cause conduction thereof to operate said relay, a supply of grid potential, and normally open contact means on said relay for connecting said supply of grid potential with said fault responsive switching devices for application therethrough to the respective grid circuits of said control tubes and for connecting said supply of grid potential to the grid of said relay control tube, said fault responsive switching devices selectively connecting the grids of said control tubes to said supply of grid potential when said contact means of said relay are closed to cause conduction of the associated control tube and current flow through said impedance device to stop conduction of said main discharge tube.

6. Fault responsive control apparatus comprising, a main normally conducting discharge tube having a load circuit to be controlled and having a grid circuit, a plurality of normally non-conducting control tubes each having respective anode circuits and a common cathode circuit including an impedance device, the grid circuit of said main discharge tube including said impedance device in a polarity sense such that discharge current of said control tubes through said impedance device is effective to stop conduction of said main discharge tube, each control tube having a grid circuit, relay means having a normally open contact, control circuit means for operating said relay means, respective fault responsive means connected with the grid of each control tube and connected with said control circuit means for operating said relay means and closing said contact upon the occurrence of a fault, grid potential supply means, and circuit means connecting said grid potential supply means through said contact and said respective fault responsive means to the respective grid circuits of said control tubes.

7. Apparatus as set forth in claim 6 in which said control circuit means comprises a normally non-conducting tube having a load circuit connected to said relay means and having a grid control circuit connected to said fault responsive means.

8. Apparatus as set forth in claim 6 in which said relay means comprises a second contact, an indicating device connected to said second contact to be controlled thereby, and an indicating device connected in the anode circuit of each control tube.

9. In a control for a textile machine having a driving motor, a left beam and a right beam and corresponding numbers of threads in the respective beams, a control system for controlling said motor and indicating thread breakage in the left or right beam and the particular thread, which comprises, relay control means for controlling the motor, a normally conductive discharge tube having a load circuit including said relay means, and having a grid circuit, an impedance device connected in said grid circuit, a group of control tubes corresponding in number to the threads of one beam, said control tubes having respective anode circuits and a common cathode circuit including said impedance device, an indicating device in each anode circuit, a grid circuit for each control tube, two groups of fault responsive devices, each of said two groups having a fault responsive device for each control tube, each fault responsive device having a pair of terminals, one terminal of each fault responsive device being connected to the grid circuit of the corresponding control tube so that each grid circuit has two fault responsive devices connected thereto, the remaining terminals of the fault responsive devices of one group being connected to a first common circuit and the remaining terminals of the fault responsive devices of the other group being connected to a second common circuit, said fault responsive devices being responsive to thread breakage and being inoperative when the corresponding thread is unbroken and operative when the corresponding thread is broken, a grid voltage connection, first and second switches each having a pair of normally open contacts and a normally closed contact, first and second control means for said first and second switches respectively, said first and second control means being normally inoperative and being rendered operative by operation of said fault responsive devices, said first control means being connected through the normally closed contacts of said second switching means to be controlled by any of the fault responsive devices connected to said first common circuit, said second control means being connected to said second common circuit through the normally closed contacts of said first switching means to be controlled by any of the fault responsive devices connected to the second common circuit, one normally open contact of the first and second switching means respectively connecting said first and second common circuits respectively to said grid potential connection for applying a triggering potential to the grid of the control tube associated with that fault responsive device which is operative, and an indicating device connected to each remaining normally open contact of each of said first and second switches to be controlled thereby.

10. Apparatus as set forth in claim 9 in which said first and said second control means each comprises a normally non-conducting tube having a load circuit for controlling said respective first and second switching means and each tube having a grid circuit controlled by the respective groups of fault responsive devices.

FRANCIS T. BAILEY.

REFERENCES CITED

The following references are of record in the file of this patent:

UNITED STATES PATENTS

| Number | Name | Date |
|---|---|---|
| 298,242 | Seiler | May 6, 1884 |
| 1,627,292 | Matthews et al. | May 3, 1927 |
| 1,980,294 | Ross et al. | Nov. 13, 1934 |
| 2,056,301 | Schroter | Oct. 6, 1936 |